No. 696,311. Patented Mar. 25, 1902.
J. J. M. BURNETTE.
NECK YOKE.
(Application filed May 17, 1901.)
(No Model.) 2 Sheets—Sheet 1.
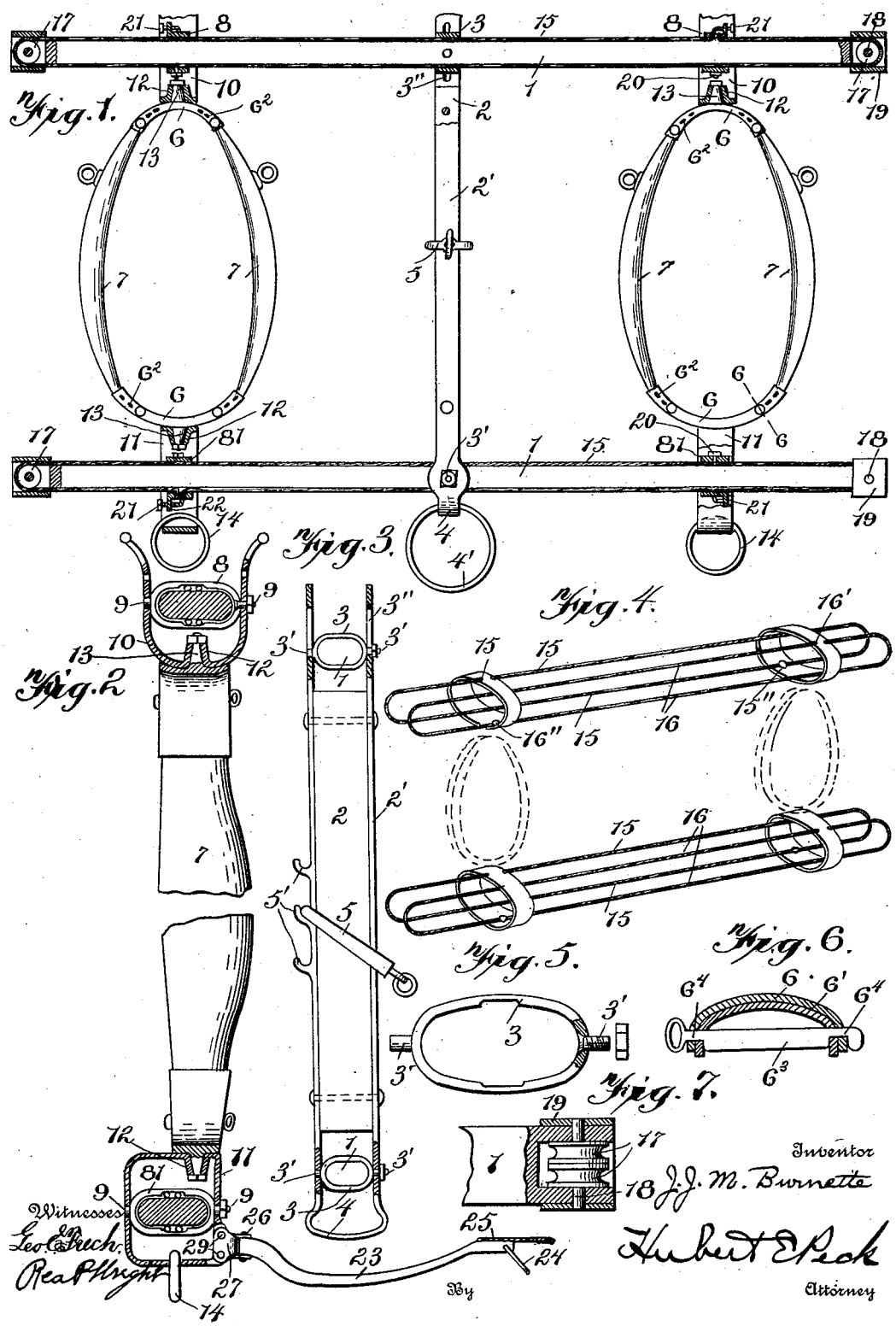
Inventor
J. J. M. Burnette
By Hubert E. Peck
Attorney
Witnesses
Leo C. Frech
Rea P. Wright

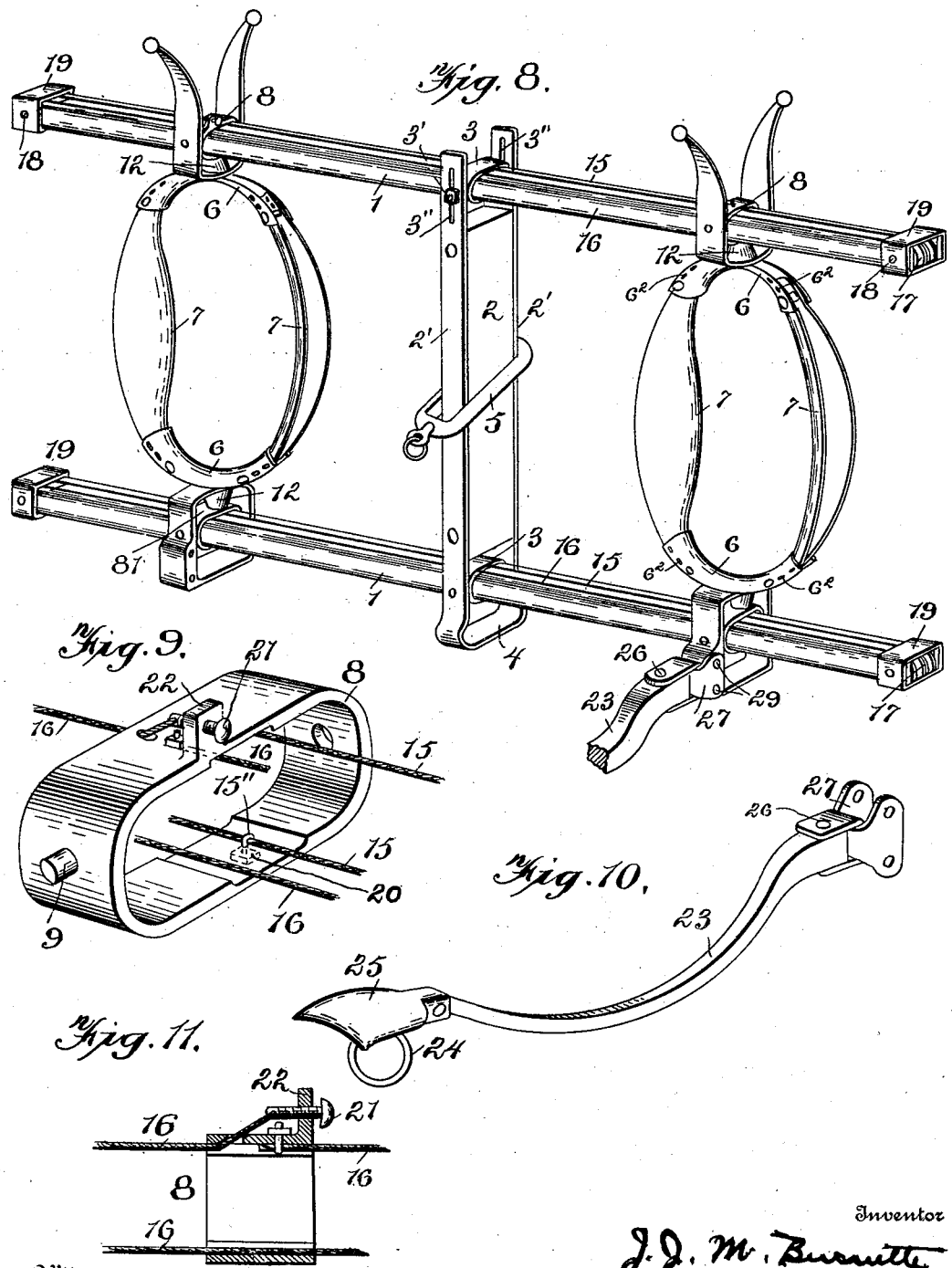

UNITED STATES PATENT OFFICE.

JEREMIAH J. M. BURNETTE, OF SPEARFISH, SOUTH DAKOTA.

NECK-YOKE.

SPECIFICATION forming part of Letters Patent No. 696,311, dated March 25, 1902.

Application filed May 17, 1901. Serial No. 60,732. (No model.)

*To all whom it may concern:*

Be it known that I, JEREMIAH J. M. BURNETTE, a citizen of the United States, residing at Spearfish, Lawrence county, South Dakota, have invented certain new and useful Improvements in Neck-Yokes; and I do hereby declare the following to be a full, clear, and exact description of the invention, such as will enable others skilled in the art to which it appertains to make and use the same.

This invention relates to improvements in draft-harness, and more particularly to improvements in double neck or draft yokes for draft-animals.

An object of the invention is to provide an improved draft-yoke of almost universal adaptation for hauling and light and heavy work on farms or for logging or sledding and other purposes, and which is capable of many adjustments to fit animals of various sizes and to proportion to any desired extent the draft or work between the two animals, and which is so formed as to be flexible and capable of automatically adjusting itself to many varied conditions and positions of the animals without injury to the animals or damage to the appliance.

Another object of the invention is to provide certain improvements in constructions, arrangements of parts, and in combinations whereby an exceedingly efficient draft-yoke is produced capable of practical use on animals varying greatly in size and under many various conditions incidental to work in the presence of widely-differing circumstances.

With these and other objects in view my invention consists in certain novel features in construction and in combinations and arrangements of details and parts, as more fully and particularly pointed out and described hereinafter.

Referring to the accompanying drawings, which show certain constructions merely as examples for the purpose of explanation among other forms within the spirit and scope of my invention, Figure 1 is an elevation of the appliance, parts being broken away to show otherwise hidden portions. Fig. 2 is an enlarged vertical section taken in a plane passing vertically and centrally of one of the bows or collars, parts being broken away and a martingale connection being shown held rigidly against independent vertical swing. Fig. 3 is an enlarged elevation of the upright draft-bar, a portion thereof being broken away. Fig. 4 is a diagrammatical view illustrating the manner of connecting and arranging the equalizing connections between the two collars, which are indicated by dotted lines. Fig. 5 is a detail elevation, partially broken away, of one of the boxes or slides to which the collars are pivotally connected and which move on the cross draft-bars. Fig. 6 is a detail cross-section, enlarged, on the line 6 6, Fig. 1. Fig. 7 is a detail horizontal section of an end of one of the cross draft-bars, showing the pulleys mounted therein to receive the equalizing connections and the surrounding bushing or sleeve. Fig. 8 is a perspective view of the neck-yoke, a martingale connection partially broken away being shown attached to the lower slide of one collar, the other martingale connection not being shown. Fig. 9 is a detail perspective view, enlarged, of one of the upper collar-slides, the equalizing connections being partially broken away. Fig. 10 is a detail perspective view, enlarged, of one of the martingale connections. Fig. 11 is a detail central vertical section through the construction shown in Fig. 9.

In the drawings, 1 1 are the two upper and lower neck-yokes or cross draft-bars, which are strongly constructed of any suitable material to sustain the great strain of the draft thereon. These bars are preferably of the same length, which should be such that the bars extend transversely of the necks of both draft-animals and project distances beyond the necks of the animals to afford the necessary opportunity for adjustment and lateral movement of the draft-animals while at work. 2 is the upright or connecting draft-bar, at its end portions pivotally coupled to and connecting said cross-bars. Said draft is preferably coupled to the cross-bars at the centers thereof and is of the necessary length to hold the upper cross-bar above the necks of the animals and the lower cross-bar beneath their necks. As the entire draft is applied through this draft-bar 2, it is desirable that the same be very strong and durable in construction. Said bar 2 can be composed of any suitable material of various constructions. I show a strong and rigid construction wherein the bar 2 comprises a continuous metal strap or bar 2', bent U-shaped and forming the front and rear longitudinal sides of the draft-bar, with a strong block of wood fitting between and bolted or otherwise secured between the parallel plies of the said strap and not quite extending the full distance between the two cross-bars. The upper cross-bar passes between the upper ends of the two plies of the strap 2' and is encircled by a metal sleeve or bushing 3, rigid therewith and located between said ends of the strap or in what might be termed the "forked" upper end of the draft-bar. This sleeve has the end pivots 3' 3', extending loosely into the vertically-elongated bearing openings or slots 3'' 3'' in said strap. The lower cross-bar passes through the eye or loop 4, formed by the doubled end of the strap at the lower end of the draft-bar. The lower cross-bar also has a sleeve 3, located between the strap-plies and provided with the pivots or pintles 3' 3', extending loosely into preferably-enlarged openings in the said strap-plies. The portion of the loop or eye 4 below the lower cross-bar preferably receives a ring 4', adapted to receive a vehicle tongue or pole when the neck-yoke is used in connection with a pole or tongue. When not so used, the ring can hang loosely, as shown in Fig. 1.

My improved neck-yoke avoids the necessity of employing two traces or tugs for each animal, as but a single connection is needed to couple the draft to the load. I attach a single trace or tug to the draft-bar, at any suitable point intermediate the ends thereof, through the medium of any suitable clevis or connecting device. For this purpose I show a clevis 5 loosely encircling the draft-bar, vertically adjustable thereon by any suitable means, such as a vertical series of projections or stops 5' at the front edge of the draft-bar. However, I do not wish to limit myself in this connection, as various draft connecting devices can be employed.

I employ two what might be termed "draft-collars" to receive the necks of the two draft-animals and rest against the shoulders thereof and through the medium of which the draft is applied to the cross and draft bars. These collars are arranged between the cross-bars and on opposite sides of the draft-bar, which constitutes the limit of inward movement of the collars. So far as the broad features of my invention are concerned each collar can be of any suitable construction and composed of any desirable material. In the specific example illustrated each collar is rendered adjustable in width and length to conform to the neck of each draft-animal and comprises the upper and lower end plates or heads 6 6 and the two bows 7 7. Each head 6 has the two ends curving outwardly in opposite directions to receive the corresponding ends of the two bows. If desired, each head can be formed of metal concave-convex in cross-section to form the longitudinal sockets or grooves 6' in the outer face thereof, in which the correspondingly-formed bow ends longitudinally fit and can be adjusted longitudinally to shorten or lengthen the collar. The bows can be formed of metal having the end portions thereof concave-convex in cross-section, if so desired, as shown by Fig. 6, with the convex faces thereof fitted in the said concave faces of the end heads. It will thus be observed that the collar can be increased in length and in width at its lower portion by moving the two bows longitudinally and outwardly of the lower head. The reverse movement contracts the collar, and the same adjustment at the upper end of the collar will increase or diminish the length of the collar and increase or diminish the width thereof at its upper portion. The bows can be detachably locked to the heads by various means. For instance, I show the end portions of each head provided with a series of transverse slots $6^2$, adapted to register with corresponding transverse slots through the bow ends. Each slot is an elongated or what might be termed a "keyhole" slot, so that the bows can be locked to the heads by removable keys $6^3$. Each collar has four keys, one for each head and bow end, and each key is flat or formed with a longitudinal flange, so that the key can be passed transversely through the head and bow and then turned to prevent accidental removal. The keys have recesses $6^4$ (see Fig. 6) to permit this turning or locking movement and to form shoulders to engage the outer walls of the head, and thus brace the head and bow ends against spreading. The keys can be released by turning until they fully register with the slots. It will thus be observed that the collars can be easily placed on the draft-animals by simply removing a key in each collar, and thus swinging out a bow on the key at the opposite end thereof. The upper end of each collar is loosely coupled with or confined to the upper cross-bar, while the lower ends of the collars are loosely confined to the lower cross-bar. Each collar is so mounted that it can turn horizontal on a vertical axis and also is permitted rocking or tilting movement in a vertical plane and longitudinally of the cross-bars. The collars are also mounted so as to have movement longitudinally of and between the cross-bars, allowing the draft-animals the necessary sidewise or lateral play. The two collars are also connected together by an equalizing device, which automatically maintains the two collars in the same relative arrangement or location with respect to the center draft-bar, as hereinafter more fully set forth. In the specific example illustrated 8 8 are two slides or boxes encircling and longitudinally movable on the upper cross-bar respectively opposite the upper ends of the collars. 81 81 are corresponding slides or boxes encircling and longitudinally movable on the lower cross-bar and respectively opposite the lower ends of the collars. Each slide has outwardly-projecting end pivots or pintles 9, arranged horizontally and loosely entering corresponding holes in the vertical portions of connecting-yokes or coupling-frames 10 11. The upper yokes 10 10 can be U-shaped, as shown, if so desired, with the upper ends of the collars pivotally joined thereto in any suitable manner by vertical pivots. In the example illustrated the under portion of each yoke 10 a distance beneath the slide and cross-bar is formed with an upwardly-tapered socket or vertical conical bearing or journal box 12, receiving a vertical tapered journal 13, rigid with and extending up from the upper head of the collar. Usually the upper end of the journal 13, projecting beyond the box 12, is threaded and provided with a nut confining the parts together and whereby the bearing can be tightened to take up wear. The lower connecting-yokes or coupling-frames 11 11 can be formed, as shown, to completely encircle and extend a distance above and below their respective slides 81, and thereby form loops below the lower cross-bar in which rings 14 can be loosely located to receive flexible martingale connections, if employed. The upper cross portion of each yoke 11 is located a distance above the slide and is pivotally joined to the lower end of its respective collar—as, for instance, by the conical socket and the conical journals rigid with the lower head of the collar, as shown, and to which the description of journal-box 12 and journal 13 applies. However, I prefer to so locate the said pivoted connections between the lower ends of the collars and the lower connecting-yokes that the lower cross-bar will be thrown forward, (see Fig. 2,) and thus clear the chests of the draft-animals and avoid rubbing of said lower cross-bar against the draft-animals. The vertical axis on which each collar rocks or oscillates can be arranged in a vertical plane, including the center longitudinal axis of the upper cross-bar, but located in rear of the center longitudinal line of the lower cross-bar. It will thus be observed that each collar is carried by and coupled to two slides arranged at the opposite ends thereof and movable longitudinally on the upper and lower cross-bars. As the load is connected to the upright draft-bar at a point between the two collars, it is obvious that the two collars must be the same distance from the upright draft-bar to exert the same leverage thereon and that whatever the positions of the collars this same relative relation between the collars and the upright draft-bar must be maintained. Hence if it is desired that both draft-animals equally share the burden the two collars must be kept equal distances from the upright draft-bars, and if one collar is moved away from the upright draft-bar the other collar must be simultaneously moved the same distance from the said draft-bar, and if one collar is moved toward said draft-bar the other collar must be simultaneously moved the same distance toward the draft-bar. To accomplish this object, I connect the slides on each cross-bar by a system of flexible equalizing connections, so that the movement of one slide longitudinally of the cross-bar will simultaneously move the other slide an equal distance in the opposite direction. Each slide is coupled in two endless parallel flexible connections arranged longitudinally of the cross-bar and passing above the upper and lower faces thereof and around the ends thereof.

15 16 are the flexible cables of each cross-bar passing over pulleys 17, mounted in the ends of the cross-bars. In the specific example shown both ends of each cross-bar are forked or bifurcated, (see Fig. 7,) and two pulleys 17 17 are located therein on a cross-shaft 18, passing through the end of the bar and through a sleeve or bushing 19, encircling the bar end. Said bushings 19 on the exteriors of the bar ends form stops to limit the outward movement of the slides. The said cables or connections pass within said end bushings, as shown in Fig. 1, and are thus held against displacement. Each cable in effect becomes an endless connection by being secured to the upper part of one slide and from thence passing freely through the upper part of the other slide on the cross-bar and around the bar end to the under side of said other slide, to which it is fastened, and from whence it passes along the under side of the bar and freely through the under side of the first-named slide and around the opposite bar end to the point of attachment first mentioned. It will thus be noted that the two slides are coupled to oppositely-moving plies of the endless connection. Two endless connections are employed on each cross-bar to connect the two slides thereof, so that the pull on the upper and lower portions of each slide will be equal to avoid wedging or binding and, among other reasons, to permit adjustment, as hereinafter set forth. By referring to Fig. 4 it will be noted that the connection 15 is fastened at 15' to the upper portion of the left-hand slide and that it passes freely through the lower portion of said slide and the upper portion of the right-hand slide, while it is fastened at 15'' to the lower portion of the right-hand slide. The connection 16 is secured at 16' to the upper portion of the right-hand slide and passes freely through the lower portion of the right-hand slide and the upper portion of the left-hand slide, but is fastened to the lower portion of the left-hand slide at 16''. The connections on the two cross-bars correspond and are coupled and connected up in the same manner.

When two draft-animals of unequal strength are hitched together in a yoke built in accordance with my invention, it is desirable to so adjust the collars as to locate the collar of the strongest animal nearer to the draft-bar than the collar of the weaker animal, and thus give the weaker animal a greater leverage on the draft-bar, and consequently distribute the work. I provide means whereby this adjustment can be attained by permitting adjustment of each slide lengthwise of the endless connections and independently of the same and of each other. By this means the connections can be loosened from the slides of a collar, so that the collar and its two slides can be shifted toward or from the draft-bar without shifting the relative position of the other collar and its two slides. The connections can then be fastened again to the two slides, so that the collars will maintain their relative positions and one will not move without the other. Various means can be employed to clamp or secure the connections to the slides to permit release therefrom or temporary loosening to permit said adjustments. For instance, I show the slides internally and transversely grooved to receive and permit passage of the connections therethrough, and at each point where a connection is to be clamped to a slide I form a hole radially through the slide and insert a hook-bolt 20 therethrough with its inner hooked end embracing the connection and drawing the same down into and clamping the same in a groove, while the bolt is held tight by the nut at its outer end. By loosening the nut the connection is so loosened that the slide can be moved independently thereof. I can also provide tension devices for taking up slack or looseness in the connections. For instance, I show each cable having an end passed outwardly through a radial opening in a slide, with its outer end loosely confined to a thumb-screw 21, screwing through a hole tapped in an ear or lug 22, rigid with and at the exterior of the slide. There are four cables, and hence I show four tension-screws, one on each slide. It is obvious that by manipulating the screws each cable can be tightened or loosened, as desired, as the lengths of the screws are parallel with the lengths of the cables, as illustrated.

If desired, I can provide the lower connecting-yoke of each collar with a removable martingale connection of such construction and arrangement as to prevent the collars being drawn up against the necks of the animals with excessive pressure in case the line of draft on the load is so high as to tend to lift the neck-yokes, and consequently choke or injure the animals. For instance, this martingale connection might be formed by a stiff bar 23, held against vertical movement and formed to pass under the animal's chest and at its rear end having an eye or loop 24 for attachment to the proper part of the harness, as will be readily understood by those skilled in the art. 25 is a flat metal (or other suitable material) shield secured to the rear portion of said stiff bar and resting thereon to bear against the chest of the animal and form a broad comfortable bearing-surface. At its front end this stiff bar is hinged by a vertical pivot 26 to a clip 27, having two rearwardly-extending ears, between which the front end of said rigid or stiff bar fits and down through which said pivot passes. Said yoke is formed with flanges parallel with two forwardly-extending flanges 27', and said flanges of the yoke and clip rest side by side and are formed with pairs of registering transverse holes receiving a pair of removable pins 29, which hold the clip to the yoke and against independent movement and yet can be removed when it is desired to remove said martingale connection from the neck-yoke. The clip and its fastenings hold the stiff bar against vertical movement, while the pivot 26 allows free lateral swing of the said bar to conform to the movements of the draft-animal. By reason of the exceedingly flexible connection of the neck-yoke, as described, it is capable of almost universal adaptation to various uses on the farm and for other work and of application to animals differing greatly in size and strength. The cross-bars can swing vertically on the draft-bar, and the collars can retain their vertical positions during such movements. The cross-bars are allowed slight independent horizontal swing independently of the draft-bar. The collars can be adjusted to different lengths—one collar longer than the other—without in any way reducing the effectiveness of the appliance, as the two cross-bars can assume positions forming various angles with the collars and with the draft-bar, and the loose connection between the top cross-bar and the draft-bar permits limited independent vertical movement of said cross-bar with respect to the draft-bar, while the couplings or joints between the collars and cross-bars permit independent rocking of the parts on horizontal axes and the collars can swing or oscillate on vertical axes. The upper or lower ends of the collars can move toward or from the draft-bar, if desired, or so shifted by the animals without so moving the opposite ends of the collars, in which case the connecting-yokes at the ends of the collars rock on the horizontal pivots joining them to the slides. In fact, the adjustments and flexibility of the device are such that the animals are free to assume all the positions necessary or desirable in performing properly their duties and also to assume many other positions and locations which may be brought about by accident without injury to themselves or to the harness. Even should one animal fall, the collars can separate to the greatest extent possible, the collar of the standing animal can remain in its normal upright position, and the cross-bars can depend therefrom at an angle to the collar of the fallen animal, or the two collars can assume various positions with the cross-bars sharply inclined down.

It is evident that various changes might be made in the forms, constructions, and arrangements of the parts described without departing from the spirit and scope of my invention. Hence I do not wish to limit myself to the constructions exactly as shown or described; but,

Having thus fully described my invention, what I claim as new, and desire to secure by Letters Patent of the United States, is—

1. A neck-yoke comprising upper and lower cross-bars, a draft connection, collars between the cross-bars, and martingale connections, each comprising a stiff bar held against vertical movement and free to swing laterally with the draft-animal, substantially as described.

2. In a neck-yoke, the combination of cross-bars, a draft connection thereto, two draft-collars between and loosely confined to said bars, connecting-frames pivotally joined to the lower ends of the collars and extending around the lower cross-bar and formed with depending loops below said cross-bar for attachment of parts of the harness, substantially as described.

3. In a neck-yoke, the combination of cross-bars, a centrally-disposed draft connection thereto, draft-collars between and loosely confined to said bars, connecting-frames loosely joined to the lower ends of the collars and encircling the lower cross-bar, and martingale connections coupled to said frames, each martingale connection comprising a rearwardly-extending stiff bar formed at its rear end for attachment to part of the harness and at its front end pivotally joined to a frame to swing laterally and means to prevent independent vertical swing thereof, substantially as described.

4. In a neck-yoke, the combination of upper and lower cross-bars, draft-collars between and movable longitudinally of the cross-bars and loosely coupled thereto to oscillate on vertical and horizontal axes, connected coupling devices between said collars and cross-bars, a draft-bar between said cross-bars and at its ends loosely coupled thereto, the upper cross-bar having limited vertical movement independently of said draft-bar, substantially as described.

5. In a draft-harness, in combination, upper and lower cross-bars, a draft connection between the same, a pair of collars between and at their ends provided with and loosely coupled to slides encircling and movable longitudinally of said cross-bars, and flexible cables extending longitudinally around the cross-bars, each cable passing around both ends of a bar and along opposite longitudinal faces thereof, one ply of each cable secured to one side of a slide and the other ply secured to the corresponding opposite side of the other slide, said cables and the slides secured thereto forming endless connections, substantially as described.

6. In a neck-yoke, in combination, cross-bars, a draft connection between the same, and draft-collars between and at their ends loosely confined to said bars, each collar comprising curved end heads having exterior longitudinal sockets or grooves, and the two curved bows at their ends fitted and longitudinally conforming to and slidable in said sockets, and removable keys passing through the bow ends and the heads, as and for the purposes set forth.

7. A neck-yoke comprising cross-bars, means for connecting the same with the load, slides on said bars, the slides on each bar connected together to move equal distances in opposite directions, draft-collars between said bars, connecting-frames pivotally joined to said slides, said collars at their ends pivotally joined to connecting-frames of corresponding slides on the two bars, substantially as described.

8. A neck-yoke comprising cross-bars, draft-collars loosely coupled to said bars, and a draft-bar having a clevis for attachment to the pull connections to the load and comprising a doubled strap forming a loop at its lower end and between the two plies of which strap the said cross-bars pass and are pivotally confined and a block secured between said two plies, substantially as described.

9. In combination, in a draft-harness, upper and lower cross-bars, an upright draft-bar at its lower end encircling and pivotally joined to the lower cross-bar and at its upper end straddling the upper cross-bar, a loose connection between said upper cross-bar and draft-bar, the lower end of said draft-bar provided with a depending loop, slides on and movable longitudinally of said cross-bars, equalizing connections operatively connecting the slides of each bar, two collars between corresponding slides of said cross-bars, and pivotal connections between the collars and slides, substantially as described.

10. In a draft-harness, in combination, upper and lower cross-bars, a draft-bar connecting the same, slides encircling the cross-bars and movable longitudinally thereon, equalizing connections operatively connecting the slides on a bar, each slide provided with and straddled by a connecting-frame pivotally joined thereto by transverse pivots, and collars between said cross-bars, each collar at its ends united by vertical pivots to certain of said connecting-frames, substantially as described.

11. In a draft-harness, in combination, upper and lower cross-bars, a pair of collars between said bars, each collar at its ends provided with and loosely coupled to slides encircling and movable longitudinally of said cross-bars, each cross-bar having a pair of separate flexible cables extending longitudinally around the same, each cable extending around both ends of the bar and along opposite longitudinal faces of the bar, one ply of each cable secured to one side of a slide and the other ply secured to the corresponding opposite side of the other slide, said cables and the slides secured thereto forming endless connections, substantially as described.

12. In a draft-harness, in combination, two cross-bars having end pulleys, two collars having end slides embracing and longitudinally movable on said bars, each bar having a pair of cables arranged longitudinally therearound and passing over said end pulleys, adjustable means removably clamping certain portions of each cable to certain portions of the slides, a tension device for each cable and carried by one of the slides on each bar, each cable having one longitudinal ply secured to one side of a slide and passing loosely through the other slide and having its opposite ply secured in the opposite portion of said other slide and passing loosely through the first-mentioned slide, substantially as described.

13. In combination, in a draft-harness, upper and lower cross-bars, a draft-bar connecting the same, a pair of collars having end slides confined to and movable longitudinally on said cross-bars, each collar having a rearwardly-extending stiff bar coupled with its lower portion and adapted to extend into engagement with the chest of the draft-animal and limit or stop the upward movement of the collar, as and for the purposes substantially described.

In testimony whereof I affix my signature in presence of two witnesses.

JEREMIAH J. M. BURNETTE.

Witnesses:
   W. H. HARLOW,
   WILLIAM POSTELANE.